US011683575B2

(12) United States Patent
Bokvist et al.

(10) Patent No.: US 11,683,575 B2
(45) Date of Patent: Jun. 20, 2023

(54) SPACE MAPPING ILLUMINATION IN IMAGE SYSTEM

(71) Applicant: Axis AB, Lund (SE)

(72) Inventors: Malte Bokvist, Lund (SE); Simon Preutz, Lund (SE)

(73) Assignee: AXIS AB, Lund (SE)

( * ) Notice: Subject to any disclaimer, the term of this patent is extended or adjusted under 35 U.S.C. 154(b) by 70 days.

(21) Appl. No.: 17/533,122

(22) Filed: Nov. 23, 2021

(65) Prior Publication Data
US 2022/0191366 A1 Jun. 16, 2022

(30) Foreign Application Priority Data
Dec. 11, 2020 (EP) ..................................... 20213292

(51) Int. Cl.
*H04N 23/56* (2023.01)
*H04N 23/74* (2023.01)
*G03B 15/05* (2021.01)

(52) U.S. Cl.
CPC ............. *H04N 23/56* (2023.01); *G03B 15/05* (2013.01); *H04N 23/74* (2023.01)

(58) Field of Classification Search
CPC ........ H04N 23/56; H04N 23/70; H04N 23/72; H04N 23/74; H04N 23/76; G03B 15/05
See application file for complete search history.

(56) References Cited

U.S. PATENT DOCUMENTS

| 7,262,798 | B2 * | 8/2007 | Stavely | H04N 23/63 348/E5.045 |
|---|---|---|---|---|
| 10,165,243 | B2 * | 12/2018 | Saito | H04N 23/88 |
| 2014/0063287 | A1 | 3/2014 | Yamada | |
| 2016/0366347 | A1 * | 12/2016 | Shin | G08B 13/19658 |
| 2019/0104246 | A1 | 4/2019 | Antretter et al. | |

* cited by examiner

*Primary Examiner* — Daniel M Pasiewicz
(74) *Attorney, Agent, or Firm* — Xsensus LLP

(57) ABSTRACT

An image system (100) comprising a camera (110), a control unit (120), a processing unit (130), one or more illumination devices (140). The image system (100) is configured to obtain a distance matrix for a scene. Each cell of the distance matrix corresponds to a zone of the scene and a value in each cell represents the distance from an object in the zone to the camera. The image system is further configured to obtain an illumination intensity matrix for the scene. Each cell of the illumination intensity matrix corresponds to a zone of the scene and a value in each cell represents illumination intensity of one or more illumination devices in each zone of the scene. The image system is further configured to generate a compensation matrix based on the illumination intensity matrix and the distance matrix and generate an image of the scene based on the compensation matrix.

9 Claims, 6 Drawing Sheets

|  | -t° | -r° | -e° | -w° | -q° | -z° | -y° | -x° | x° | y° | z° | q° | w° | e° | r° | t° |
|---|---|---|---|---|---|---|---|---|---|---|---|---|---|---|---|---|
| q° | ∞/1 | ∞/1 | ∞/30 | ∞/40 | ∞/30 | ∞/1 | ∞/1 | ∞/1 | ∞/1 | ∞/1 | ∞/30 | ∞/40 | ∞/30 | ∞/1 | ∞/1 | 10/1 |
| z° | ∞/1 | ∞/40 | ∞/50 | ∞/60 | ∞/50 | ∞/40 | ∞/1 | ∞/1 | 60/1 | ∞/40 | 40/50 | ∞/60 | ∞/50 | ∞/40 | ∞/1 | 10/1 |
| y° | 30/35 | 30/50 | 50/75 | 50/80 | 30/75 | 30/50 | 50/40 | 40/1 | 40/35 | 40/50 | 30/75 | 20/80 | 20/75 | 10/50 | 10/40 | |
| x° | 30/40 | 30/60 | 30/80 | 30/100 | 30/80 | 30/60 | 30/40 | 30/1 | 30/40 | 40/60 | 30/80 | 20/100 | 20/80 | 10/60 | 10/40 | |
| -x° | 30/30 | 30/50 | 30/75 | 30/80 | 30/75 | 30/50 | 30/30 | 30/1 | 30/30 | 30/50 | 30/75 | 20/80 | 20/75 | 10/50 | 10/30 | |
| -y° | 20/1 | 20/40 | 20/50 | 20/60 | 20/50 | 20/40 | 20/1 | 20/1 | 20/1 | 20/40 | 10/50 | 20/60 | 20/50 | 10/40 | 10/1 | |
| -z° | 10/1 | 10/1 | 10/30 | 10/40 | 10/30 | 10/1 | 10/1 | 10/10 | 10/1 | 10/1 | 10/30 | 10/40 | 10/30 | 10/1 | 10/1 | |
| -q° | | | | | | | | | | | | | | | | |

SPACE MAPPING ILLUMINATION IN IMAGE SYSTEM

CROSS-REFERENCE TO RELATED APPLICATION

This application claims priority to European Patent Application No. 20213292.4, filed on Dec. 11, 2020, the disclosure of which is incorporated herein by reference in its entirety.

TECHNICAL FIELD

Embodiments herein relate to an image system and a method therein for generating and processing images. In particular, the embodiments relate to generating and processing an image of a scene when using a light to illuminate the scene.

BACKGROUND

When capturing an image of a scene in low visible light with a camera, e.g. a city block, a road, an industrial site, an open square, a parking lot, a park or any place without daylight or in low visible light, one or more illumination devices, e.g. InfraRed (IR) devices which generate IR light, Light Emitting Diode (LED) lights etc., may be used to illuminate the scene. It is often found that there may be too much illumination resulting in reflections and poor image quality, or too little illumination resulting in a dark picture. The reason for this is that a camera which has wide-area coverage, e.g. a panoramic camera, more often than other cameras has a large variation of distances to the objects in the scene it is looking at. For example, a panoramic camera is often placed outside on a side wall of a building. This may result in that some objects, e.g. the wall, the ground directly below the camera etc., are extremely close to the camera, while some parts of the scene are further away from the camera, e.g. the other side of the scene etc. The objects that are close to the camera may get too much illumination and/or the objects that are further away from the camera may not get enough illumination, which may result in that the image quality of the scene therefore not can be guaranteed.

US20190104246 discloses an optoelectronic lighting device that illuminates a scene to be captured as an image includes a pixelated emitter including a plurality of light emitting pixels that illuminate a scene to be captured as an image, and a driving device configured to individually drive the pixels depending on at least one parameter to illuminate the scene to be recorded with a predetermined illuminance distribution.

US20140063287 discloses an imaging apparatus comprising an image sensor that images an image of a photographic subject; a flash that emits light to the photographic subject; and a controller that controls the flash to emit light to the photographic subject, in a case where the image of the photographic subject in an imaged image formed on the image sensor is underexposed, wherein the controller includes a dividing and amplifying function part that divides the imaged image into a plurality of grid-like blocks, and applies digital gain per each divided block; and a flash emission influence degree determination function part that determines a flash influence degree per each divided block, and in a case of emitting the flash and performing shooting, the controller determines a value of the digital gain applied per each divided block by the dividing and amplifying function part, in accordance with the flash influence degree per each divided block determined by the flash emission influence degree function part.

SUMMARY

It is therefore an object of embodiments herein to provide an improved method and apparatus for generating and processing an image of a scene when one or more illumination devices are used to illuminate the scene.

According to a first aspect of embodiments herein, the object is achieved by a method performed in an image system for generating an image of a scene. The image system obtains a distance matrix for the scene. Each cell of the distance matrix corresponds to a zone of the scene and a value in each cell represents a distance from an object in each zone to a camera. The image system further obtains an illumination intensity matrix for the scene. Each cell of the illumination intensity matrix corresponds to a zone of the scene and a value in each cell represents illumination intensity of one or more illumination devices in each zone of the scene. The image system then generates a compensation matrix based on the illumination intensity matrix and the distance matrix. The image system adjusts the intensity of the one or more illumination devices based on the compensation matrix and capture an image of the scene by the camera using the one or more illumination devices with adjusted intensity and then adjust pixel values of the captured image based on the compensation matrix to generate the image of the scene.

According to a second aspect of embodiments herein, the object is achieved by an image system. The image system is configured to obtain a distance matrix for the scene. Each cell of the distance matrix corresponds to a zone of the scene and a value in each cell represents a distance from an object in the zone to a camera. The image system is further configured to obtain an illumination intensity matrix for the scene. Each cell of the illumination intensity matrix corresponds to a zone of the scene and a value in each cell represents illumination intensity of one or more illumination devices in each zone of the scene. The image system is further configured to generate a compensation matrix based on the illumination intensity matrix and the distance matrix. The image system is further configured to adjust the intensity of the one or more illumination devices based on the compensation matrix and capture an image of the scene by the camera using the one or more illumination devices with adjusted intensity and then adjust pixel values of the captured image based on the compensation matrix to generate the image of the scene.

In other words, since objects that are close to the camera may require a lot less light than those objects that are further away from the camera, the distances from the different objects in the scene to the camera needs to be known, thus a distance matrix is obtained for the scene. Further, an illumination intensity matrix is obtained for the scene which gives information on the illumination intensities of one or more illumination devices in each zone of the scene when illuminating the scene. Then a compensation matrix is generated based on the illumination intensity matrix and the distance matrix. To improve image quality of the scene, the image of the scene is generated based on the compensation matrix by adjusting the intensity of the one or more illumination devices based on the compensation matrix and capturing an image of the scene by the camera using the one or more illumination devices with adjusted intensity and then adjusting pixel values of the captured image based on the compensation matrix.

Therefore, according embodiments herein, to improve the image quality, the compensation matrix is used in processing the captured image by adjusting the illumination intensities of the captured image, i.e. adjusting the pixel values of the captured image, e.g. tuning down the illumination intensities for the objects which are close to the camera, and/or tuning up the illumination intensities for the objects which are further away from the camera. The compensation matrix is also used to adjust the intensity of the illumination devices, e.g. decrease the intensity of the illumination devices targeting those areas close to the camera and boost the intensity of the illumination devices targeting those areas that are further away from the camera. The compensation matrix is used to adjust both the intensity of the illumination devices and the illumination intensities of the captured image.

By mapping the environment and space of a scene around the camera with the intensity of the illumination devices, information on how much illumination that is needed in each zone of the scene is obtained. The image quality of the scene can then be improved by using this information. The illumination devices is also optimized based on this information to get a maximum coverage of the scene while using as little power as possible. The power efficiency of the illumination devices may thus be improved.

Therefore, the embodiments herein provide an improved method and apparatus for generating and processing an image of a scene when using one or more illumination devices to illuminate the scene.

BRIEF DESCRIPTION OF THE DRAWINGS

Examples of embodiments will be described in more detail with reference to attached drawings in which:

FIG. 9 is a simplified image of the scene mapped with an illumination intensity matrix and a distance matrix according to embodiments herein; and FIG. 10 is a table illustrating a compensation matrix according to embodiments herein.

DETAILED DESCRIPTION

Figure 1:
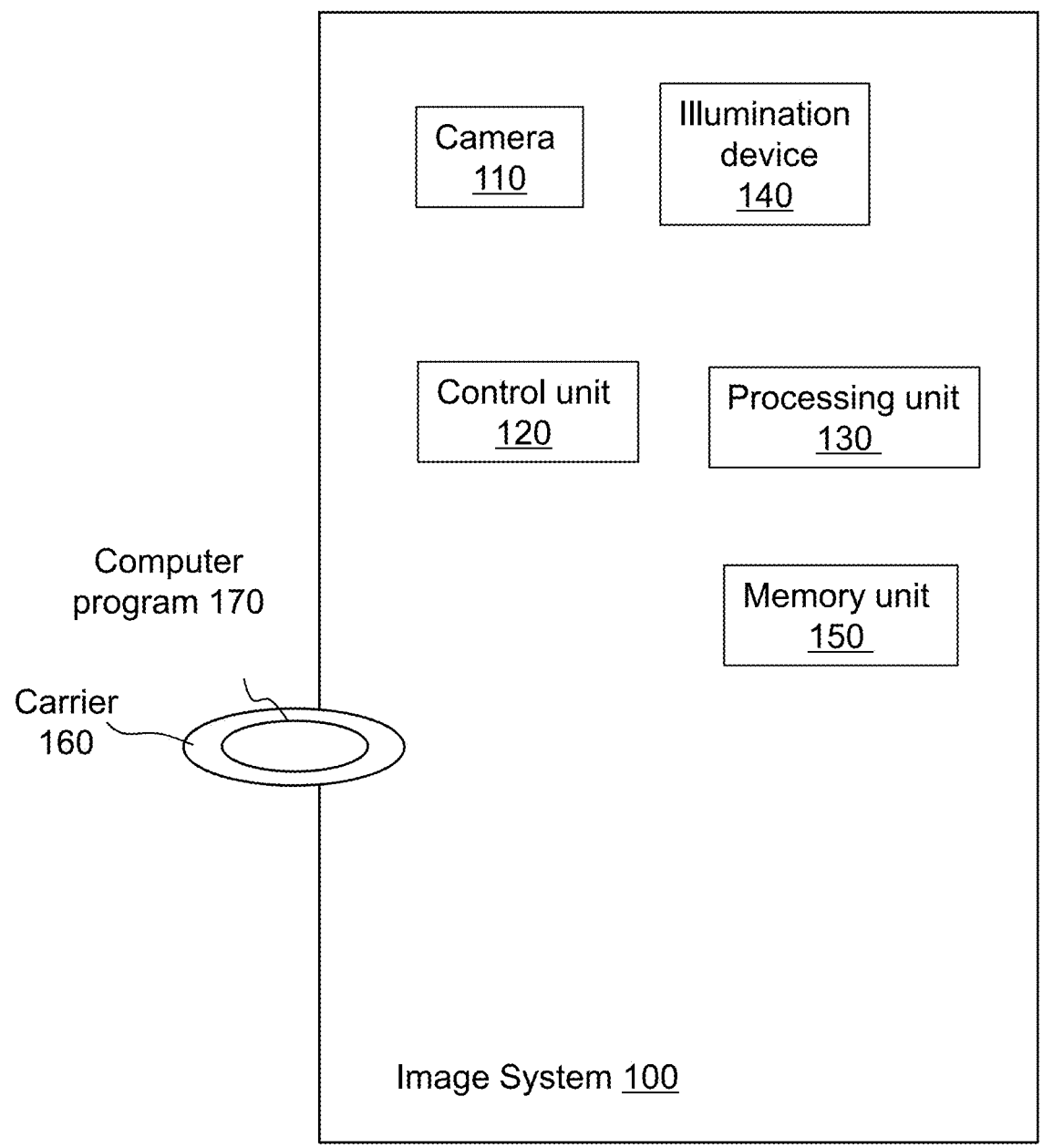
FIG. 1 is a schematic block diagram illustrating an image system in which embodiments herein may be implemented.

FIG. 1 shows an image system 100 in which a method for generating an image of a scene may be implemented. The image system 100 is a combination of different elements involved in image capturing and processing. For examples, the image system 100 may comprise a camera 110, which may be any kind of camera, e.g. a panoramic camera . . . for capturing an image of a scene. The camera 110 may be mounted on a wall or roof of a building. The image system 100 may further comprise a control unit 120 for coordinating operations of the different elements in the image system 100, such as sending and receiving configurations, commands, requests, image data etc. The image system 100 may further comprise a processing unit 130 which may comprise software and hardware for processing images. The image system 100 may further comprise one or more illumination devices 140 for illuminating a scene. The one or more illumination devices 140 may be integrated in the camera 110 or may be separate components and placed nearby the camera 110. The image system 100 may further comprise a memory unit 150 for storing image data, configurations, program code etc. The control unit 120, processing unit 130 and memory unit 150 may be separate units or a combined unit and may be located at the same place or at different places.

The different elements 110, 120, 130, 140, 150 in the image system 200 may communicate with each other via a network which may be any wireless communication networks or Ethernet, if they are separated units and located at different places.

Those skilled in the art will also appreciate that said units 120, 130, 140 described above may refer to a combination of analog and digital circuits, and/or one or more processors configured with software and/or firmware, that when executed by the one or more processors perform the method as described herein. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 2:
FIG. 2 is an example of a scene in view of a camera.

FIG. 2 shows an example scene 200 of a city block in view of a camera 110. As it can be seen from FIG. 2, there are a lot of different objects in the scene 200 and their distances to the camera 110 have a very large variation. When capturing an image of the scene 200 by a camera 110 using illumination devices 140, e.g. InfraRed (IR) devices, to illuminate the scene, the image quality may be too poor, e.g. the ground underneath the camera 110 may be too bright and the building further away may be too dark, or the whole image of the scene 200 may be too bright or too dark.

Figure 3:
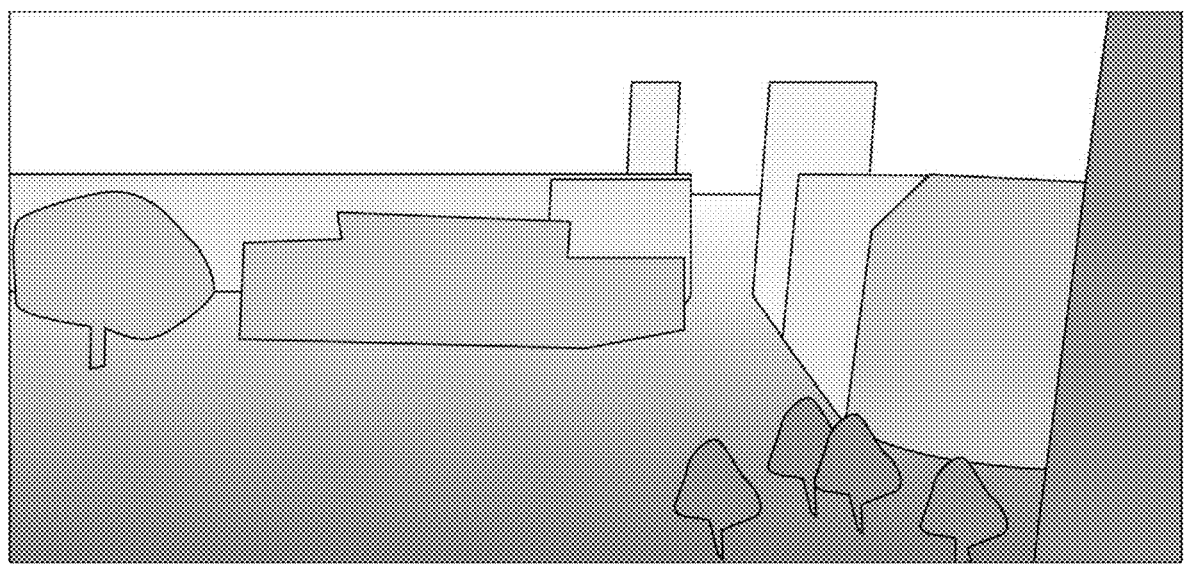
FIG. 3 is a simplified image of the scene shown in FIG. 2.

A method for generating an image of a scene with improved quality is developed according embodiments herein. For easy understanding of the principle of the method, FIG. 3 shows a simplified image of the scene 200, and the method is described hereafter with reference to this simplified image of the scene 200.

Figure 4:
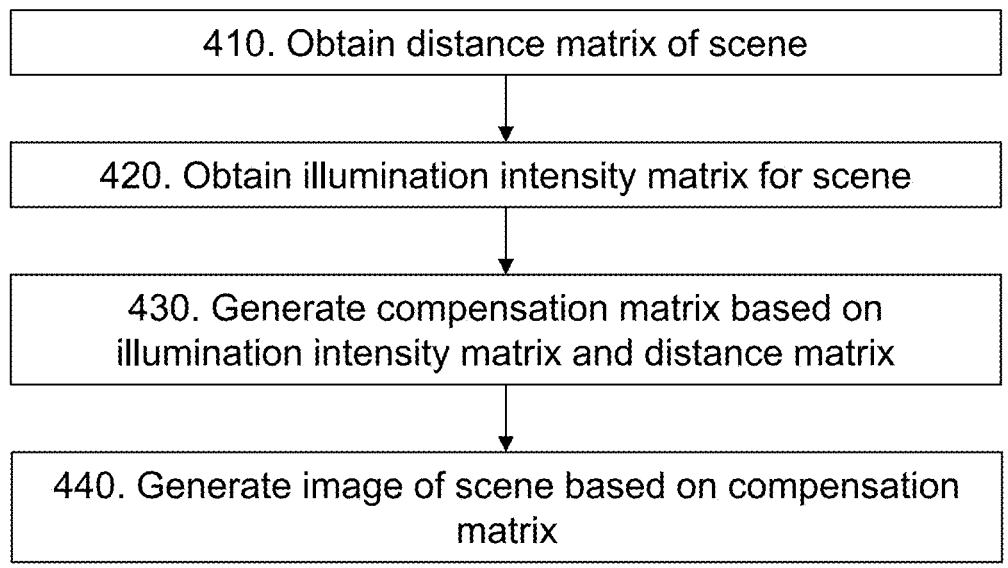
FIG. 4 is a flow chart illustrating a method according to embodiments herein.

The method for generating an image of a scene 200 according to embodiments herein will be described in detail with reference to FIG. 4. The method comprises the following actions, which actions may be performed in any suitable order and/or one or more actions may be performed simultaneously and/or in alternate order where applicable.

Action 410

Figure 5:
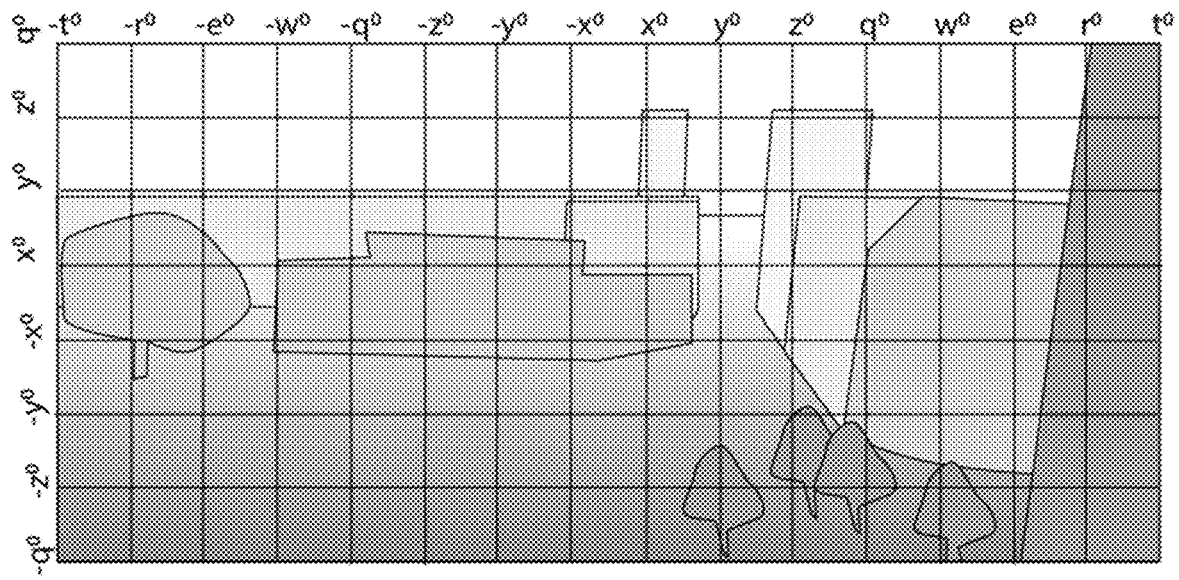
FIG. 5 is a simplified image of the scene shown in FIG. 3 where the scene is divided in zones according to embodiments herein.

In order to get an understanding of the space around the camera 110 and get to know the distances from the different objects in the scene 200 to the camera 110, the image system 100 obtains a distance matrix for the scene 200. The image of the scene 200 may be divided or arranged in zones with co-ordinates in two-dimension as shown in FIG. 5. The term "zone" used in this context may refer to segment, sector, area, part, section, region in which the scene is divided according to the distances from the camera to the different objects in the scene 200.

Figure 6:
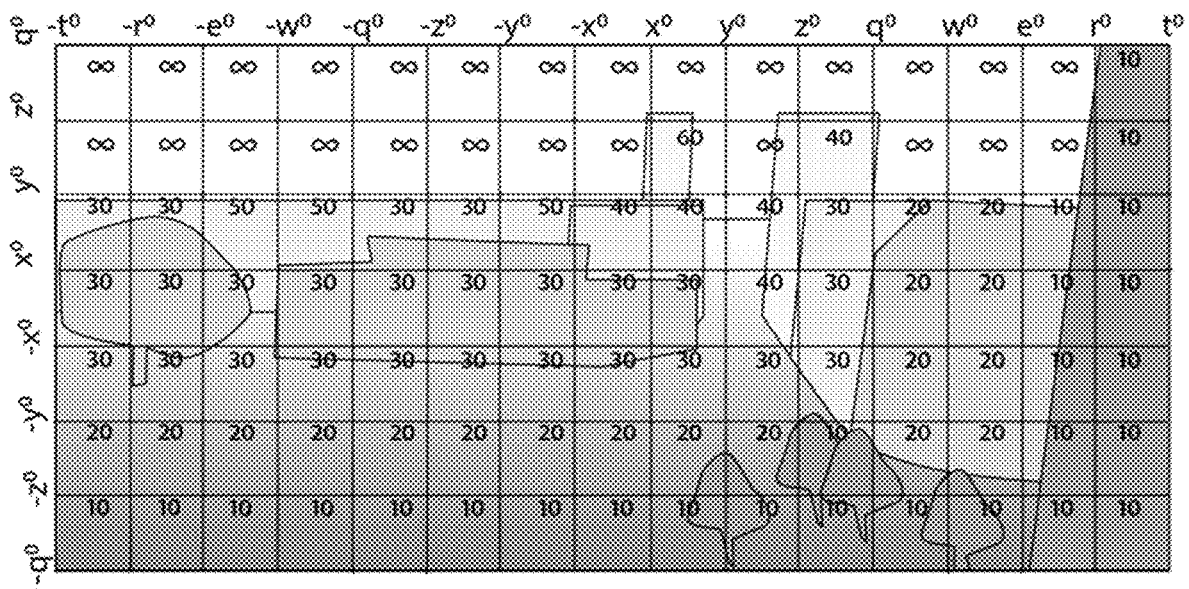
FIG. 6 is a simplified image of the scene mapped with a distance matrix according to embodiments herein.

FIG. 6 shows the simplified image of the scene 200 mapped with the distance matrix according to embodiments herein. Each cell of the distance matrix corresponds to a zone of the scene 200 and the value in each cell represents the distance to an object in each zone from the camera 110. FIG. 6 is only for illustrating purpose, the number of zones and cells may be different and will be dependent on different situations, implementations and quality requirements. That is, the number of cells in the distance matrix may depend on different scenes and situations. For examples, for a scene with less details, e.g. a parking lot, the number of cells in the distance matrix may be small, and each cell of the distance matrix may correspond to a group of pixels of the image. For a scene with more details, such as the scene 200 in FIG. 2, the number of cells in the distance matrix may be large, and each cell of the distance matrix may correspond to one pixel of the image.

There are several ways to obtain the distance matrix. According to some embodiments herein, the distance matrix of a scene 200 may be generated by scanning the surroundings of the camera 110 using any one or a combination of a radar device, a laser detection and ranging device or a light detection and ranging (LiDAR) device. The LiDAR device is a remote sensing process which collects measurements used to create 3D models and maps of objects and environments. Using ultraviolet, visible, or near-infrared light, LiDAR maps spatial relationships and shapes by measuring the time it takes for signals to bounce off objects and return to the scanner. The radar device may be a low intensity cost-effective radar capable of in a satisfying manner mapping the surroundings.

According to some embodiments herein, the distance matrix of the scene 200 may be generated by using at least two gyroscopes at least partly comprised in the camera 110. For instance, a first gyroscope may be positioned on the main circuit board of the camera 110 and a second gyroscope on one of the sensors circuit board of the camera 110. Alternatively, a first gyroscope may be fixed to the base of the camera 110 and a second gyroscope fixed to the position of the optics of the camera 110. In this way, one can use the gyroscope fixed to the base, to know how the camera 110 is mounted, e.g. on a wall, pended down etc. The other gyroscope may be used to know the angled position of the lenses in relation to the base of the camera 110. And as such, one can know where the camera is, and how it is angled. Using this information, one can feed that data into a function and generate a distance matrix for the scene. The distance matrix of the scene can give an understanding of what the scene looks like. That is, how far the light needs to travel from the different objects in the scene before hitting every pixel of the image sensor in the camera 110.

Action 420

The image system 100 obtains an illumination intensity matrix for the scene 200. Each cell of the illumination intensity matrix corresponds to a zone of the scene and the value in each cell represents illumination intensity of the one or more illumination devices 140 in each zone of the scene 200 when illuminating the scene 200.

Figure 7:
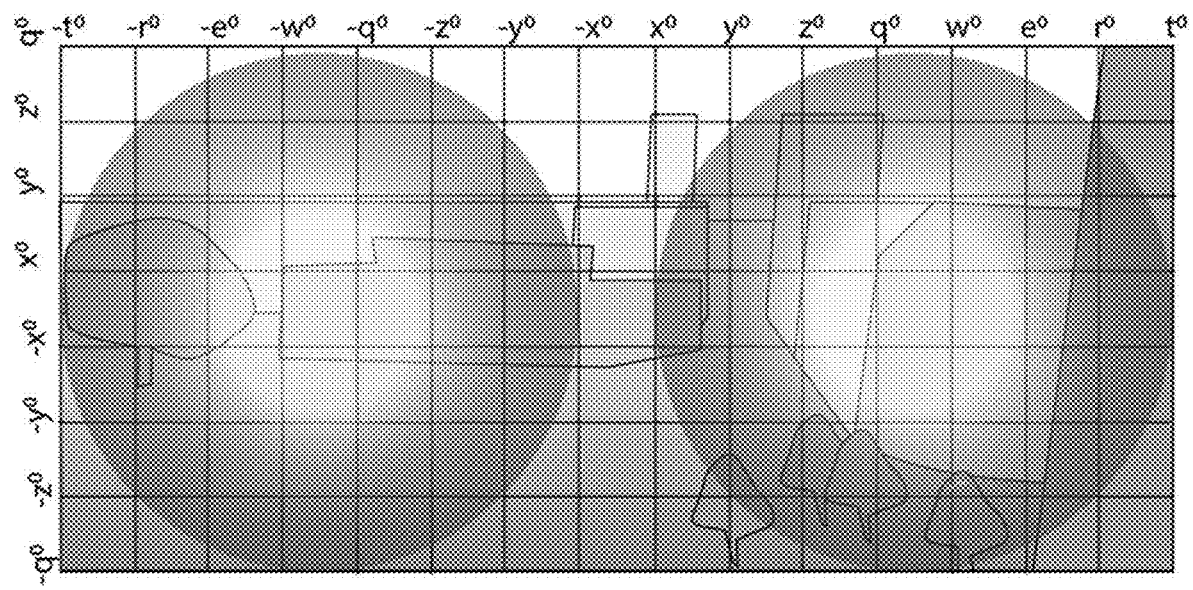
FIG. 7 is a simplified image of the scene with light cones generated by one or more illumination devices.

FIG. 7 shows the simplified image of the scene mapped with light cones generated by two illumination devices 140. There are usually multiple illumination devices 140 to cover a panoramic scene. The positions of the illumination devices 140 are usually known. One can use a similar graph of the scene 200 as in generating the distance matrix to calculate the intensities of the illumination devices 140 and how much these illumination devices 140 interact with each other and add to each other in each zone of the scene 200 to generate the illumination intensity matrix for the scene 200. The one or more illumination devices 140 may be integrated within the camera 110 and/or separated from the camera 110. For example, the one or more illumination devices 140 may be located nearby the camera 110. The illumination intensity matrix for the scene 200 may be generated based on the positions of the two or more illumination devices 140 and their interactions. For example, one may use the datasheet of an illumination device 140 and can find a light distribution graph relative to that illumination device 140, the luminous intensity value and the maximum luminous intensity value etc. Then one knows how much every illumination device 140 will contribute with light. Adding the light contributions from the two or more illumination devices 140 that are used to light the scene 200 together, one can get an illumination intensity matrix for the scene 200.

Figure 8:
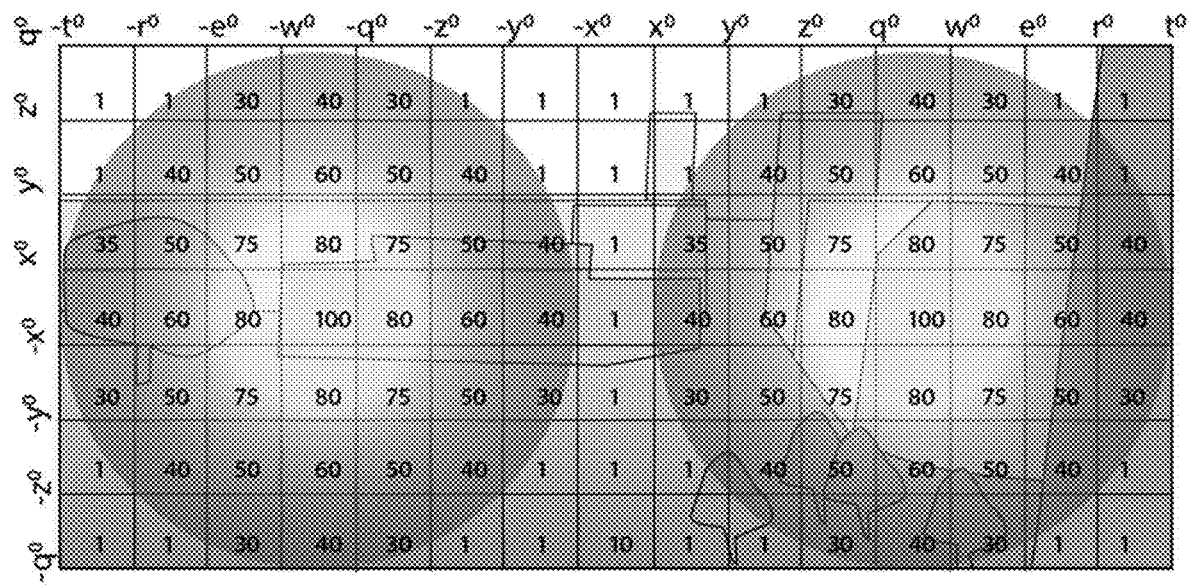
FIG. 8 is a simplified image of the scene mapped with an illumination intensity matrix according to embodiments herein.

FIG. 8 shows the simplified image of the scene 200 mapped with the illumination intensity matrix generated according to embodiments herein. The value in each cell represents the illumination intensity of the one or more illumination devices 140 in each zone of the scene 200 when illuminating the scene 200. For example, the illumination intensity is high for the zones in the middle of the light core and decreasing gradually for the zones in the outer circles of the light core.

Action 430

Since the illumination intensity in relation to the distance is the most useful information for improving the image quality, the image system combines or maps the distance matrix with the illumination intensity matrix to generate a compensation matrix. That is, the compensation matrix is generated based on the illumination intensity matrix and distance matrix. FIG. 9 illustrates such a combination where the simplified image of the scene 200 is mapped with the combined illumination intensity matrix and distance matrix.

FIG. 10 shows a table to illustrate the compensation matrix with a compensation value in each cell. As shown in FIG. 10, the compensation value in each cell of the compensation matrix is calculated by dividing the distance value by the illumination intensity value in each cell. The compensation value in each cell of the compensation matrix may also be calculated by dividing the illumination intensity value by the distance value in each cell.

Therefore, according to some embodiments herein, the compensation matrix may be generated by dividing the illumination intensity value in each cell of the illumination intensity matrix by the distance value in the corresponding cell of the distance matrix.

Alternatively, according to some embodiments herein, the compensation matrix may be generated by dividing the distance value in each cell of the distance matrix by the illumination intensity value in the corresponding cell of the illumination intensity matrix.

Further, according to some embodiments herein, the compensation matrix may be generated by multiplying the distance matrix with the illumination intensity matrix.

According to some embodiments herein, the compensation values of the compensation matrix may be adjusted by a first set of weights.

According to some embodiments herein, the distance matrix may be adjusted by a second set of weights and the compensation matrix may be generated by multiplying the adjusted distance matrix with the illumination intensity matrix.

According to some embodiments herein, the illumination intensity matrix may be adjusted by a third set of weights and the compensation matrix may be generated by multiplying the adjusted illumination intensity matrix with the distance matrix.

According to some embodiments herein, the illumination intensity matrix and the distance matrix may be adjusted by a fourth and a fifth sets of weights respectively, and the compensation matrix may be generated by multiplying the adjusted illumination intensity matrix with the adjusted distance matrix.

According to some embodiments herein, the compensation matrix may be generated by dividing the square of the distance value in each cell of the distance matrix by the illumination intensity value in the corresponding cell of the illumination intensity matrix.

According to some embodiments herein, the compensation matrix may be generated by dividing the illumination intensity value in each cell of the illumination intensity matrix by the square of the distance value in the corresponding cell of the distance matrix.

Action 440

The image system 100 generates an image of the scene 200 based on the compensation matrix to improve the image quality of the scene 200. The compensation matrix may either be used to boost or decrease the intensity of a specific illumination devices 140, or to increase or decrease the value of specific pixels during image processing.

There are different alternatives to use the compensation matrix to improve the image quality:

The image system 100 may adjust the intensity of the one or more illumination devices 140 based on the compensation matrix and capture an image of the scene 200 by the camera 110 using the one or more illumination devices 140 with adjusted intensity.

The image system 100 may capture an image of the scene 200 by the camera 110 using the one or more illumination devices 140 with normal intensity settings and adjust pixel values of the captured image based on the compensation matrix.

According to the embodiments herein, the image system 100 adjusts the intensity of the one or more illumination devices 140 based on the compensation matrix and capture an image of the scene 200 by the camera 110 using the one or more illumination devices 140 with adjusted intensity and then adjust pixel values of the captured image based on the compensation matrix.

According to some embodiments herein, the intensity of the one or more illumination devices 140 targeting zones within a predeterminable distance from the camera 110 may be decreased and the intensity of the illumination devices 140 targeting zones further away than the predeterminable distance from the camera 110 may be boosted.

According to some embodiments herein, the pixel values of the captured image may be increased for zones further away than a predeterminable distance from the camera 110 and decreased for zones within the predeterminable distance from the camera 110.

According to some embodiments herein, the intensity of the illumination devices 140 and/or pixel values of the captured image may be adjusted based on the compensation matrix such that the total range of the pixel values of the captured image is reduced. That is, compensations or calibrations may be made to level out the range of the pixel values such that a better image is generated with fewer defects. In order to calibrate, the expected illumination or pixel values from a current frame needs to be provided. The expected illumination or pixel values are then compared with the actual illumination or pixel values of the scene, and those actual illumination or pixel values which have a deviation from the expected illumination or pixel value larger than a predefined threshold are adjusted such that the deviation from the expected illumination or pixel value is reduced.

To summarise, some advantages according to embodiments herein includes:

Improving image quality. By mapping the environment and space of a scene around the camera with the intensity of the illumination devices, information on how much illumination that are needed in each zone of the scene is obtained. This information is represented in the compensation matrix. Then the image quality of the scene can be improved by using this information.

Improving the power efficiency of the illumination devices. The illumination devices may also be optimized based on this information to get a maximum coverage of the scene while using as little power as possible.

Improving image calibration: Image calibration due to value range are done all the time, however image calibration based on the space mapping illumination information according to embodiments herein may provide an improved image calibration technique. The compensation matrix also gives information on the expected range for the pixel values. With the understanding of the expected value range, image calibrations may be able to provide a better image with fewer defects since the natural deviations on the pixel values caused by the scene is known.

The method for generating an image of a scene according to embodiments herein may be implemented in any image system such as a mobile phone, a surveillance system, a network camera system or any video camera etc. FIG. 1 is an example embodiment of an image system 100. The image system 100 is configured to perform the method according to any one of the Actions 410-440 described above.

Furthermore, the embodiments herein for generating an image of a scene may be implemented through one or more processors, such as the processing unit 130, together with computer program code for performing the functions and actions of the embodiments herein. Said program code may also be provided as a computer program product, for instance in the form of a data carrier 160 carrying computer program code 170 as shown in FIG. 1 for performing the embodiments herein when being loaded into the image system 100. One such carrier may be in the form of a CD ROM disc and/or a hard drive, it is however feasible with other data carriers. The computer program code 170 may furthermore be provided as pure program code on a server or a cloud and downloaded to the image system 100.

Therefore, the disclosed subject-matter further relates to a computer program product comprising a computer program containing computer program code arranged to cause a computer or a processor to execute the actions of the image system 100 described herein, stored on a computer-readable medium or a carrier wave. The disclosed subject-matter further relates to a non-volatile computer readable storage medium having stored thereon said computer program product.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method for generating an image of a scene by an image system, the method comprising:

obtaining a distance matrix for the scene, wherein each cell of the distance matrix corresponds to a zone of the scene and a value in each cell represents a distance from an object in each zone to a camera;

obtaining an illumination intensity matrix for the scene, wherein each cell of the illumination intensity matrix corresponds to a zone of the scene and a value in each cell represents illumination intensity of one or more illumination devices in each zone of the scene;

generating a compensation matrix based on the illumination intensity matrix and the distance matrix;

characterized by adjusting the intensity of the one or more illumination devices based on the compensation matrix;

capturing an image of the scene by the camera using the one or more illumination devices with adjusted intensity; and adjusting pixel values of the captured image based on the compensation matrix to generate the image of the scene.

2. The method according to claim 1, wherein the compensation matrix is generated by any one of:

dividing the illumination intensity value in each cell of the illumination intensity matrix by the distance value in the corresponding cell of the distance matrix;

dividing the distance value in each cell of the distance matrix by the illumination intensity value in the corresponding cell of the illumination intensity matrix;

dividing the square of the distance value in each cell of the distance matrix by the illumination intensity value in the corresponding cell of the illumination intensity matrix;

dividing the illumination intensity value in each cell of the illumination intensity matrix by the square of the distance value in the corresponding cell of the distance matrix.

3. The method according to claim 1, wherein the compensation matrix is generated by any one of:

multiplying the distance matrix with the illumination intensity matrix;

multiplying the distance matrix with the illumination intensity matrix and adjusting the compensation values of the compensation matrix by a first set of weights;

adjusting the distance matrix by a second set of weights and multiplying the adjusted distance matrix with the illumination intensity matrix;

adjusting the illumination intensity matrix by a third set of weights and multiplying the adjusted illumination intensity matrix with the distance matrix;

adjusting the illumination intensity matrix and the distance matrix by a fourth and a fifth sets of weights respectively, and multiplying the adjusted illumination intensity matrix with the adjusted distance matrix.

4. The method according to claim 1, wherein the intensity of the one or more illumination devices and the pixel values of the captured image are adjusted based on the compensation matrix such that a total range of the pixel values of the captured image is reduced.

5. The method according to claim 1 wherein obtaining a distance matrix of the scene comprises generating the distance matrix of the scene by scanning the surroundings of the camera using any one or a combination of a radar device, a laser detection and ranging device or a light detection and ranging device.

6. The method according to claim 1, wherein the one or more illumination devices are integrated within the camera, and/or separated from the camera and located nearby the camera, and the illumination intensity matrix is generated based on the positions of the two or more illumination devices and their interactions.

7. An image system comprising a camera, a control unit, a processing unit, one or more illumination devices, wherein the image system is configured to perform the method according to claim 1.

8. The image system according to claim 7 is any one of a mobile phone, a surveillance system, a network camera system, a video camera.

9. A computer program product comprising a computer program containing computer program code arranged to cause a computer or a processor to execute the method according to claim 1.

* * * * *